United States Patent
Hayward et al.

(10) Patent No.: US 7,380,735 B2
(45) Date of Patent: Jun. 3, 2008

(54) METHOD FOR PREPARING EXTREMELY SMALL PARTICLES OF RECYCLED POLYETHYLENE TEREPHTHALATE

(75) Inventors: Donald W. Hayward, Waterville, OH (US); Daniel L. Witham, Holland, OH (US)

(73) Assignee: Phoenix Technologies International, LLC, Bowling Green, OH (US)

( * ) Notice: Subject to any disclaimer, the term of this patent is extended or adjusted under 35 U.S.C. 154(b) by 497 days.

(21) Appl. No.: 10/549,039

(22) PCT Filed: Mar. 12, 2004

(86) PCT No.: PCT/US2004/007561

§ 371 (c)(1),
(2), (4) Date: Sep. 16, 2005

(87) PCT Pub. No.: WO2004/095390

PCT Pub. Date: Nov. 4, 2004

(65) Prior Publication Data

US 2006/0175442 A1 Aug. 10, 2006

Related U.S. Application Data

(60) Provisional application No. 60/459,809, filed on Apr. 2, 2003.

(51) Int. Cl.
*B02C 19/00* (2006.01)
(52) U.S. Cl. ............... 241/19; 241/23; 241/24.28; 528/502 F
(58) Field of Classification Search ........... 241/19, 241/23, 24.28; 528/502 F, 271, 272, 480
See application file for complete search history.

(56) References Cited

U.S. PATENT DOCUMENTS

| 3,728,309 | A | * | 4/1973 | Maxion ............... 528/481 |
| 5,824,196 | A | | 10/1998 | Schloss |
| 5,994,017 | A | | 11/1999 | Lin |

FOREIGN PATENT DOCUMENTS

| DE | 199 05 321 A1 | 8/2000 |
| DE | 100 43 778 A1 | 3/2002 |
| EP | 0 940 239 A1 | 9/1999 |
| EP | 1 052 269 A1 | 11/2000 |
| WO | WO 96/30180 A | 10/1996 |
| WO | WO 01/34688 A1 | 5/2001 |

OTHER PUBLICATIONS

Sturtevant, Inc., NSP Powderizer Pamphlet, Powder Processing Technology: The Sturtevant Solution, 1999, 5 pages, SV704, Published by Sturtevant, Inc., Hanover, MA.
Brady, Thomas E., Ph.D., President of Plastic Technologies, Inc., A Study and Review of PET/PVC Separation Technologies (Final Report), Sep. 1992, 82 pages, Printed by Plastic Technologies, Inc., Holland, Ohio. Prepared for The National Association for Plastic Container Recovery, Charlotte, North Carolina.

* cited by examiner

*Primary Examiner*—Mark Rosenbaum
(74) *Attorney, Agent, or Firm*—Fraser Clemens Martin & Miller LLC; Donald R. Fraser

(57) ABSTRACT

A process for preparing extremely small RPET particles comprises proving a quantity of RPET flakes, increasing the crystallinity of the RPET flakes, separating a portion of the RPET flakes having the lowest particle density from the remainder of the RPET flakes, and comminuting the remaining RPET flakes, to prepare RPET particles having an average mean particle size less than 500 microns.

14 Claims, No Drawings

METHOD FOR PREPARING EXTREMELY SMALL PARTICLES OF RECYCLED POLYETHYLENE TEREPHTHALATE

CROSS REFERENCE TO RELATED APPLICATION

This Application claims the benefit of U.S. Provisional Patent Application Ser. No. 60/459,809 filed on Apr. 2, 2003.

FIELD OF THE INVENTION

This invention relates generally to a method for preparing extremely small particles of recycled polyethylene terephthalate (RPET). More particularly, the invention is directed to a multi-step process for preparing RPET particles with an average mean particle size less than about 500 microns.

BACKGROUND OF THE INVENTION

Post-consumer processing of recycled polyethylene terephthalate (PET) to manufacture a variety of useful consumer products such as flower pots and fence posts is well-known. Typically, the recycling process utilizes used PET containers, such as discarded carbonated beverage containers, which are collected, sorted, washed, and separated from contaminants to yield a relatively clean source of RPET. Additionally, the manufacture of imperfect and damaged molded PET products, particularly the blow molded bottles used for containing consumer goods, results in a considerable amount of PET waste which the manufacturers of such products would like to reuse. The RPET produced by conventional recycling processes is generally in ground or flake form, which is thereafter melt processed or further pelletized by the end user.

RPET is generally subjected to a grinding operation in order to make the material easier to handle and process. Conventional grinding equipment reduces the RPET to about ⅜ inch particles or flakes. The grinding is conducted in a manner to insure that a consistent flake size will be produced, by employing a grate or screen through which the ground material must pass upon exiting the grinder. Although conventional RPET flakes melt processing and pelletizing equipment is designed to handle ⅜ inch flakes, some RPET materials having sizes as large as M inch and as small as ¼ inch are also commercially produced. The bulk density of ⅜ inch flake RPET generally ranges from about 22 to about 35 pounds per cubic foot.

Similarly, RPET and PET pellets are generally formed to a standard, uniform size of about 0.12 inch in diameter. The bulk density of such pellets generally ranges from about 50 to about 58 pounds per cubic foot. Typically, PET and RPET melt processing equipment is designed to accept pellets having the above-mentioned dimensions and physical characteristics.

Conventional methods for comminuting virgin materials to extremely small particle sizes, utilizing ball mills, impact grinding, cryogenic grinding, pulverizing, attrition mills, and the like, are well known. However, none of these methods is effective for reducing RPET derived from used bottles and other containers to extremely small particle sizes. RPET flakes resist communition by conventional methods to particle sizes much smaller than about 500 microns. The polyethylene terephthalate bottles and containers from which RPET flakes are typically derived are manufactured in a manner that imparts great strength and toughness, by incorporating high levels of biaxial orientation into the container sidewalls. This biaxially oriented structure inherently resists fracturing, cracking, splitting, and cutting, which are the conventional processes involved in comminuting operations.

It would be desirable to develop a process for preparing extremely small particles of RPET from standard RPET flakes.

SUMMARY OF THE INVENTION

Accordant with the present invention, a process for preparing extremely small particles of RPET has surprisingly been discovered. It comprises the steps of providing a quantity of RPET flakes, increasing the crystallinity of the RPET flakes, separating a portion of the RPET flakes having a lower particle density from the remainder of the RPET flakes, and comminuting the remaining RPET flakes, to prepare RPET particles having an average mean particle size less than about 500 microns.

The process of the present invention is particularly useful for preparing particles of RPET smaller than about 500 microns from recycled polyethylene terephthalate bottles and containers.

DETAILED DESCRIPTION OF THE PREFERRED EMBODIMENT

The present invention is directed to a process for preparing extremely small RPET particles, comprising the steps of providing a quantity of RPET flakes, increasing the crystallinity of the RPET flakes, separating a portion of the RPET flakes having a lower particle density-from the remainder of the RPET flakes, and comminuting the remaining RPET flakes, to prepare RPET particles having an average mean particle size less than about 500 microns. By the term "RPET flakes" as it is used herein is meant generally the commercially available recycled polyethylene terephthalate materials produced by conventional recycling methods, usually in flake form, but which may additionally be in the form of chunks, spheres, pellets, and the like, and which are generally made available in bulk in a substantially uniform particles sizes from about ¼ inch to about ½ inch diameter.

As will be readily apparent to those skilled in the art of polymer processing, the quantity of RPET flakes to be provided for subsequent processing may vary over wide limits, and is generally determined by reference to the quantity of extremely small particles of RPET ultimately desired.

According to the present invention, the crystallinity of the RPET flakes is increased. Conveniently, this may be accomplished by simply heating the RPET flakes to a temperature above the glass transition temperature (Tg) of the polyethylene terephthalate from which the RPET flakes were derived. Generally, the temperature to which the RPET flakes are increased in order to increase the crystallinity of the RPET flakes is greater than about 150 degrees Celsius. The RPET flakes are maintained at the elevated temperature for a time sufficient to effect an increase in the average crystallinity of the RPET flakes. This time period may vary over wide limits, from several minutes to several hours, and may be easily determined by one ordinarily skilled in the art of polymer processing.

According to the present invention, the RPET flakes having the increased crystallinity are subjected to a process for separating a portion of the RPET flakes having a lower particle density from the remainder of the RPET flakes, which of course have a higher particle density. This process step effectively removes a majority of the RPET flakes that were derived from the sidewalls of the recycled polyethylene terephthalate containers. These highly biaxially oriented sidewall portions of the original containers have a lower particle density than the RPET flakes derived from the remainder of the recycled container.

Conveniently, the separation may be effected by air elutriation, in which the RPET flakes derived from the sidewalls of the original containers having a lower particle density are separated from the other RPET flakes. By the term "particle density" as it is used herein is meant the density of the RPET flake as determined by dividing the mass of the flake by the hydrodynamic volume of the flake. As will be readily apparent to those ordinarily skilled in the art, other conventional methods for separating the RPET flakes having a lower particle density from the remainder of the RPET flakes are well-known. A particularly useful air elutriation device for performing this separation step may be obtained from Kice Industries of Wichita, Kansas under the product designation "MULTI-ASPIRATOR."

According to the present invention, the remaining RPET flakes having the elevated crystallinity are comminuted by conventional methods to prepare RPET particles having an average mean particle size less than about 500 microns. Preferably, the average mean particle size of the comminuted RPET particles is equal to or less than about 300 microns.

A particularly useful method for comminuting the remaining RPET flakes comprises impact fracturing, whereby RPET flakes are introduced into a rotating disk, accelerated to a high velocity, and impinged on a discontinuous wheel where the particles are fractured into extremely small particles. A preferred device for accomplishing this comminution step may be obtained from Sturtevant Inc. of Hanover, Massachusetts under the product designation "NSP POWDERIZER."

This extremely small particle size, i.e., an average mean particle size less than about 500 microns, may be achieved only after the crystallinity of the RPET flakes has been increased and the highly biaxially oriented portions of the RPET flakes have been removed. An attempt simply to comminute untreated RPET flakes will not result in the extremely small particle sizes produced by the inventive process.

The process for preparing extremely small particles of RPET described hereinabove is generally disclosed in terms of its broadest application to the practice of the present invention. Occasionally, the process conditions or methods as described may not be precisely applicable to each kind of RPET flake included within the disclosed scope. Those instances where this occurs, however, will readily be recognizable by those ordinarily skilled in the art. In all such cases, the overall process may be successfully performed by conventional modifications to the disclosed process.

The invention is more easily comprehended by reference to specific embodiments recited hereinabove which are representative of the invention. It must be understood, however, that the specific embodiments are provided only for the purpose of illustration, and that the invention may be practiced otherwise than as specifically illustrated without departing from its spirit and scope.

What is claimed is:

1. A process for preparing extremely small RPET particles, comprising the steps of:
   providing a quantity of RPET flakes;
   increasing the crystallinity of the RPET flakes;
   separating a portion of the RPET flakes having a lower particle density from the remainder of the RPET flakes; and
   comminuting the remaining RPET flakes, to prepare RPET particles having an average mean particle size less than about 500 microns.

2. The process for preparing extremely small RPET particles according to claim 1, wherein the RPET flakes comprise chunks, spheres, pellets, or mixtures thereof.

3. The process for preparing extremely small RPET particles according to claim 1, wherein the RPET flakes have particle sizes from about ¼ inch to about ½ inch.

4. The process for preparing extremely small RPET particles according to claim 1, wherein the crystallinity of the RPET flakes is increased by heating the RPET flakes to a temperature above the glass transition temperature of the polyethylene terephthalate from which the RPET flakes were derived.

5. The process for preparing extremely small RPET particles according to claim 4, wherein the temperature is greater than about 150° Celsius.

6. The process for preparing extremely small RPET particles according to claim 4, wherein the RPET flakes are maintained at the elevated temperature for a period of time ranging from about ten minutes to about twenty-four hours.

7. The process for preparing extremely small RPET particles according to claim 1, wherein the portion of the RPET flakes having a lower particle density is separated from the remainder of the RPET flakes by air elutriation.

8. The process for preparing extremely small RPET particles according to claim 1, wherein the remaining RPET flakes are comminuted to prepare RPET particles having an average mean particle size less than about 300 microns.

9. The process for preparing extremely small RPET particles according to claim 1, wherein the RPET flakes are comminuted by impact fracturing.

10. A process for preparing extremely small RPET particles, comprising the steps of:
    providing a quantity of RPET flakes, comprising chunks, spheres, pellets, or mixtures thereof, having particle sizes from about ¼ inch to about ½ inch;
    increasing the crystallinity of the RPET flakes, by heating the RPET flakes to a temperature above the glass transition temperature of the polyethylene terephthalate from which the RPET flakes were derived;
    separating, by air elutriation, a portion of the RPET flakes having a lower particle density from the remainder of the RPET flakes; and
    comminuting, by impact fracturing, the remaining RPET flakes, to prepare RPET particles having an average mean particle size less than about 500 microns.

11. The process for preparing extremely small RPET particles according to claim 10, wherein the. RPET flakes are heated to a temperature greater than about 150° Celsius.

12. The process for preparing extremely small RPET particles according to claim 10, wherein the RPET flakes are maintained at the elevated temperature for a period of time ranging from about ten minutes to about twenty-four hours.

13. The process for preparing extremely small RPET particles according to claim 10, wherein the remaining RPET flakes are comminuted to prepare RPET particles having an average mean particle size less than about 300 microns.

14. A process for preparing extremely small RPET particles, comprising the steps of:

providing a quantity of RPET flakes, comprising chunks, spheres, pellets, or mixtures thereof, having particle sizes from about ¼ inch to about ½ inch;

increasing the crystallinity of the RPET flakes, by heating the RPET flakes to a temperature greater than about 150° Celsius and maintaining the elevated temperature for a period of time ranging from about ten minutes to about twenty-four hours;

separating, by air elutriation, a portion of the RPET flakes having a lower particle density from the-remainder of the RPET flakes; and comminuting, by impact fracturing, the remaining RPET flakes, to prepare RPET particles having an average mean particle size less than about 300 microns.

* * * * *